United States Patent
Quinn et al.

(10) Patent No.: US 7,032,072 B1
(45) Date of Patent: Apr. 18, 2006

(54) METHOD AND APPARATUS FOR FAST LOOKUP OF RELATED CLASSIFICATION ENTITIES IN A TREE-ORDERED CLASSIFICATION HIERARCHY

(75) Inventors: Michael J. Quinn, Campbell, CA (US); Mary L. Laier, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 754 days.

(21) Appl. No.: 10/039,992

(22) Filed: Dec. 31, 2001

(51) Int. Cl.
*G06F 12/00* (2006.01)

(52) U.S. Cl. ............ 711/118; 370/230.1; 370/235; 370/256; 370/255; 370/392; 370/395.21; 370/395.43; 370/408; 370/902; 709/213; 709/223; 709/232; 709/238; 709/240; 718/106

(58) Field of Classification Search .......... 370/230.1, 370/235, 256, 255, 392, 395.21, 395.43, 370/408, 902; 709/213–215, 223–224, 232, 709/238, 240; 711/118, 216; 718/106–108
See application file for complete search history.

(56) References Cited

U.S. PATENT DOCUMENTS

| | | | |
|---|---|---|---|
| 6,046,980 A * | 4/2000 | Packer | 370/230 |
| 6,751,627 B1 * | 6/2004 | Sternin | 707/101 |
| 6,768,739 B1 * | 7/2004 | Kobayashi et al. | 370/392 |
| 2002/0143984 A1 * | 10/2002 | Hudson Michel | 709/238 |
| 2003/0185209 A1 * | 10/2003 | Lee | 370/390 |

* cited by examiner

*Primary Examiner*—Christian P. Chace
(74) *Attorney, Agent, or Firm*—Mark J. Spolyar

(57) ABSTRACT

A method and apparatus for performing classification in a hierarchical classification system performing caching are described. In one embodiment, the method comprises walking a classification tree in the hierarchical classification system to determine whether an incoming flow matches a class in the classification tree, and performing a lookup on a cache storing a data structure of multiple classes of one classification type to compare the incoming flow with multiple classes at the same time to determine whether the incoming flow matches one of the classes.

21 Claims, 5 Drawing Sheets

Sort Classification Tree to Group Similar Classification Types
101

Perform Tree Walking to Classify a Packet of a Flow
102

Perform Cache Lookup to Determine if Class of the Packet is in a Cacheable Portion of the Tree

FIG. 1

Classification Tree Example

TC-0
TC-1  C1        ← start of C1 cacheables (address group)
TC-2  C1
TC-3            ← end of C1 cacheables
TC-4  C2        ← start of C2 cacheables (protocol type group)
TC-5  C2
TC-6  C3        ← start of C3 cacheables, end of C2 cacheables, F1 hits TC-6
TC-7            ← end of C3 cacheables (port matching group)
DEFAULT

FIG. 5

Case 1: First packet of Flow1 (F1) is classified as TC6.

| | | | Pass Number through the While Loop | | | | |
|---|---|---|---|---|---|---|---|
| data | 1st | 2nd | 3rd | 4th | 5th | 6th | 7th |
| tclass | TC-0,1 TC-1,11 | TC-2,11 | TC-3,11 | TC-4,11 | TC-5,11 | TC-6,11 | |
| inCache | FALSE,2 | TRUE,9 | FALSE,12 | | TRUE,9 | | TRUE,9 |
| cacheProc | | C1,6 | | | C2,6 | | C3,6 |
| cacheEnd | | TC-3,6 | | | TC-6,6 | | TC-7,6 |
| C1 add | | | F1,12 NF* | | | | |
| C2 add | | | | | | F1,12 NF* | |
| C3 add | | | | | | | F1,10F* |

*NF and F represent NOT FOUND and FOUND.

FIG. 6

Case 2: Second packet of Flow1 (F1) is classified as TC6.

| | | Pass Number through the While Loop | | |
|---|---|---|---|---|
| data | 1st | 2nd | 3rd | 4th |
| tclass | TC-0,1 TC-1,11 | TC-3,8 TC-4,11 | TC-6,8 | TC-6,7 |
| inCache | FALSE,2 | | | |
| cacheProc | | C1,6 | C2,6 | C3,6 |
| cacheEnd | | TC-3,6 | TC-6,6 | TC-7,6 |
| C1 lookup | | NOTFOUND,6 | | |
| C2 lookup | | | NOTFOUND,6 | |
| C3 lookup | | | | FOUND,6 |

FIG. 7

METHOD AND APPARATUS FOR FAST LOOKUP OF RELATED CLASSIFICATION ENTITIES IN A TREE-ORDERED CLASSIFICATION HIERARCHY

FIELD OF THE INVENTION

The present invention relates to the field of the use of a classification tree to classify traffic as part of performing network monitoring and management; more particularly, the present invention relates to the use of caching in hierarchical classification tree processing.

BACKGROUND OF THE INVENTION

A traffic class is a logical grouping of traffic flows that share the same characteristics—a specific application, protocol, address or set of addresses. A flow is a single instance of a connection, session or packet-exchange activity by an identified traffic class. For example, all packets in a TCP connection belong to the same flow, as do all packets in a UDP session.

Traffic classes have the property, or class attribute, of being directional, i.e. all traffic flowing inbound will belong to different traffic classes and be monitored and managed separately from traffic flowing outbound. The directional property enables asymmetric classification and control of traffic, i.e., inbound and outbound flows belong to different classes that may be managed independent of one another.

Traffic classes may be defined at any level of the TCP/IP protocol. For example, at the IP level, traffic may be defined as only those flows between a set of inside and outside IP addresses or domain names. An example of such a low level traffic class definition would be all traffic between my network and other corporate offices throughout the Internet. At the application level, traffic classes may be defined for specific URLs within a web server. Traffic classes may be defined having "Web aware" class attributes. For example, a traffic class could be created such as all URLs matching "*.html" for all servers, or all URLs matching "*.gif" for server X, or for access to server Y with URL "/sales/*" from client Z, wherein '*' is a wildcard character, i.e., a character which matches all other character combinations. Traffic class attributes left unspecified will simply match any value for that attribute. For example, a traffic class that accesses data objects within a certain directory path of a web server is specified by a URL of the directory path to be managed, e.g. "/sales/*".

The classification of traffic is well-known in the art. For example, U.S. Pat. No. 6,285,658 describes a method for classifying traffic according to a definable set of classification attributes selectable by the manager, including selecting a subset of traffic of interest to be classified. As described therein, the ability to classify and search traffic is based upon multiple orthogonal classification attributes.

Traffic class membership may be hierarchical. Thus, a flow may be classified by a series of steps through a traffic class tree, with the last step (i.e., at the leaves on the classification tree) specifying the specific traffic class that the flow belongs to. For example, the first step in classification may be to classify a flow as web traffic, the next may further classify this flow as belonging to server X, and the final classification may be a match for URI "*.avi".

A classification tree is a data structure representing the hierarchical aspect of traffic class relationships. Each node of the classification tree represents a class, and has a traffic specification, i.e., a set of attributes or characteristics describing the traffic, and a mask associated with it. Leaf nodes of the classification tree may contain policies (information about how to control the class of traffic). The classification process checks at each level if the flow being classified matches the attributes of a given traffic class. If it does, processing continues down to the links associated with that node in the tree. If it does not, the matching process continues on with the next (sibling) class. The last sibling in the tree must always be a default (match-all) class to catch any flows that did not match any of the classes in the rest of the tree.

More specifically, the classification tree is a N-ary tree with its nodes ordered by specificity. For example, in classifying a particular flow in a classification tree ordered first by organizational departments, the attributes of the flow are compared with the traffic specification in each successive department node and if no match is found, then processing proceeds to the next subsequent department node. If no match is found, then the final compare is a default "match all" category. If, however, a match is found, then classification moves to the children of this department node. The child nodes may be ordered by an orthogonal paradigm such as, for example, "service type." Matching proceeds according to the order of specificity in the child nodes. Processing proceeds in this manner, traversing downward and from left to right in the classification tree, searching multiple orthogonal paradigms. The nodes are often arranged in decreasing order of specificity to permit searching to find the most specific class for the traffic before more general.

A number of problems exist with using classification trees. First, tree-based classification is an inherently slow process. As discussed above, it requires walking the classification tree one node at a time searching for matches until a class is found that matches the incoming flow or packet. In a large tree, this becomes very time consuming. For example, in the case of an Internet Service Provider (ISP) wanting to classify an incoming flow/packet by address, when they have thousands of customers, a large amount of time would be expended walking down the tree to locate a match.

Second, another problem that may exist is that a class tree may have a number of types of classes. For example, a classification tree may include IP addresses, services, and ports. However, there is no a-priori specification as to which of the multiple types of classes to attempt to match first.

SUMMARY OF THE INVENTION

A method and apparatus for performing classification in a hierarchical classification system performing caching are described. In one embodiment, the method comprises walking a classification tree in the hierarchical classification system to determine whether an incoming flow matches a class in the classification tree, and performing a lookup on a cache storing a data structure of multiple classes of one classification type to compare the incoming flow with multiple classes at the same time to determine whether the incoming flow matches one of the classes.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram of one embodiment of a process for performing classification.

FIG. 5 illustrates an exemplary classification tree.

FIGS. 6 and 7 illustrate adding information about a flow to a cache and later using that information for a faster lookup.

DETAILED DESCRIPTION

Figure 2:
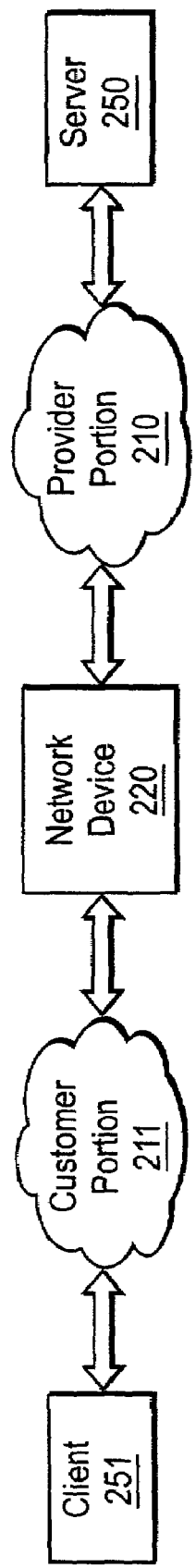
FIG. 2 illustrates one embodiment of a network environment.

A classification tree is used to classify incoming packets. In one embodiment, the method comprises walking a classification tree in the hierarchical classification system to determine whether an incoming flow matches a class in the classification tree, and performing a lookup on a cache storing a data structure of multiple classes of one classification type to compare the incoming flow with multiple classes at the same time to determine whether the incoming flow matches one of the multiple classes.

The techniques described herein solve the problems described above with respect to the time consuming prior art process of walking a classification tree by grouping similar items together in the tree and creating a data structure for quickly determining whether the current packet/flow matches any of the items in one or more portions of the tree. In one embodiment, the data structure is a hash table and lookups are performed on the hash table to determine if an incoming flow/packet matches a class in the hash table. Almost constant-time class lookups occur when the item is found in the cache, and lookups that do not hit the cache are able to skip large sections of the classification tree.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A technique for enabling and performing a fast lookup of related classification entities in a tree-ordered classification hierarchy is described. In one embodiment, the tree-ordered classification hierarchy is a hierarchical tree structure that represents the traffic classes in a parent-child relationship. A monitoring/managing network device, described in greater detail below, uses the criteria defined by the traffic class to identify traffic flows. Traffic classes can be broadly defined or very specific. By specifying attributes of a traffic flow, such as, for example, IP address, protocol, application/service, port number, and URL, the network device characterizes the traffic types and manages them based on that characterization.

In one embodiment, the network device uses a cache memory for processing parts of the classification tree to help check flows quickly and apply policy, if appropriate. That is, portions of the classification tree are cached and the network device encounters those portions while traversing the classification tree to determine if a match exists between the traffic classes and the incoming flow. When a cacheable portion of the classification tree is encountered, the network device performs a cache lookup to determine if the incoming flow matches one of the classes of the traffic class type that is cached. In this manner, the network device is able to check the incoming flow against multiple traffic classes at the same time, instead of performing comparisons of traffic classes to the incoming flow one traffic class at a time. Thus, the use of such a cache improves classification performance.

In one embodiment, the cache includes commonly used IP address based classes and uses pre-allocated memory for either IP addresses (or subnets). However, alternative embodiments may include additional or different traffic types, such as services and port numbers.

FIG. 1 is a flow diagram of one embodiment of a process for performing classification. The process is performed by processing logic that may comprise hardware (e.g., circuitry, dedicated logic, etc.), software (such as is run on a general purpose computer system or dedicated machine), or a combination of both. For example, the processing logic may be part of a network device that allocates bandwidth. In such a case, the network device identifies the traffic passing through it and matches the characteristics of the flow with traffic classes that are represented in a hierarchical tree. The tree is organized to show parent-child relationships. In other words, a class may have a subordinate child class that has more specific criteria than its parent class. The tree lists classes in the order that the network device searches to determine to which class the given traffic flow belongs and hence, how much bandwidth to allocate to the flow.

Referring to FIG. 1, the network device initially reorders the classification tree to group similar classification types together (processing block 101). In doing so, the network device keeps track of the start and end of "cacheable" areas of the tree that represent portions of the tree that are processed using cache lookups instead of node-by-node processing of the classification tree. For instance, classification by port number, classification by destination address, or classification by protocol type constitute types of classifications that could be grouped together to allow for caching. Thus, this re-ordering process allows the grouping of similar classifications together.

In one embodiment, the classification tree includes portions of the tree that include multiple classification types. These are referred to herein as portions of the tree with "mixed" classification types. During re-ordering, these portions of the tree are placed in the classification tree after all the portions of the classification tree that have a single classification type (e.g., only IP address, only service types, only port numbers, etc.).

The re-ordering of the classification tree is not necessary in cases where the tree is already ordered in a way such that similar classification types are grouped together already.

Thereafter, in response to an incoming flow or packet, normal tree-walking is performed on the classification tree in order to classify the incoming flow (processing block 102). The processing of the classification tree occurs in a manner well-known in the art until a start of cacheable portion of the tree is encounter. At this point, a cache lookup is performed.

In one embodiment, a hash table is used and stored in the cache memory for each classification type (e.g., IP address, service, port, etc.). In the case of IP address caching, as the tree is being walked, when a cacheable area of the tree is entered, a hash function is computed. This function depends on the type of the cache (e.g., a cache of IP address classes will use a hash function on the IP address, whereas a cache for IP port classes will use a possibly different hash function which uses the IP port as the input). The application of a hash function and use of hash tables are well-known in the art. When the incoming flow is processed by the network device, as each cacheable area of the tree is entered during the tree-walk, the corresponding cache is consulted. In this manner, the network device performs classification in part by performing a cache lookup using a hash of some type.

There are one of four states of a cache lookup result:

1) the result is no cache entry (when class type not previously encountered by network device.)

2) the result is in the cache (i.e. a class value is saved in the cache), 3) the result is not in the cache (as indicated in the cache), or 4) the result is unknown (i.e., a class value has not yet been saved in the cache.

In the first case, the result is added to the hash table with an indication that the result does not have an entry in the hash table (i.e., the cache). In other words, the result is marked as "no cache entry". Adding an element to a hash table is well-known in the art. This case results in performing a walk through on the cacheable portion of the classification tree.

In the second case, if a class in the cacheable portion of the classification tree matches the class of the incoming flow, the result is returned from the cache. In one embodiment, the result returned from the cache is class pointer, which is indicative of user programming information that has been assigned the class.

In the third case, since an entry in the hash table was added previously to indicate that the class associated with the incoming flow is not in the cache, the network device is able to skip to the end of the cacheable area of the tree for this classification type.

In the fourth case, the network device performs a walk through on the cacheable portion of the tree. If a class is hit, then the class is stored in the cache and the result is returned (e.g., a class pointer and, thus, user programming information. If a class is not hit, then the classification engine marks the cache result as "not in the cache" (flagging that there is no cached class), and continues with the rest of the classification tree, starting at the end of the cacheable area for this cache block.

Note that the use of a hash function is not required. In the alternative, other methods of accessing an array or table representing a portion of the classification tree may be used.

A Network Environment

FIG. 2 illustrates one embodiment of a network environment. Referring to FIG. 2, the network environment includes a provider portion 210 of the network and a customer portion 211 of the network. Provider portion 210 of the network couples one or more servers (e.g., server 250) to the network, while customer portion 211 of the network couples one or more clients (e.g., client 251) to the network. Note that the techniques of the present invention are not limited to a network that includes client and provider portions.

Network device 220 classifies traffic flows and packets and applies preassigned policies to the flows/packets based on their classification.

An Exemplary Network Device

Figure 3:
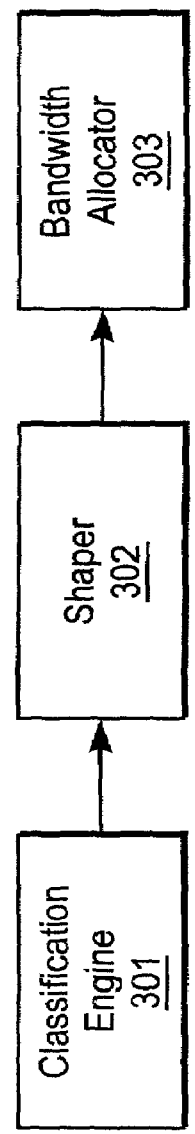
FIG. 3 is a block diagram of a network device.

FIG. 3 is a data flow diagram of one embodiment of a network device described herein. Referring to FIG. 3, a classification engine 301 classifies traffic in the traffic flow. As described herein, classification is performed using a classification tree. The traffic may be classified using a number of types of metrics.

After classification, the traffic goes through shaping block 302 that performs any necessary shaping on the traffic. For more information on shaping, see U.S. application Ser. No. 08/977,376, entitled "Method for Managing Flow Bandwidth Utilization at Network, Transport and Application Layers," now abandoned, filed Nov. 24, 1997, incorporated herein by reference and assigned to the corporate assignee of the present invention.

Once classified, a bandwidth allocator 303 allocates network bandwidth to the flow/packet based on a policy assigned to the class of traffic as part of the user programming information.

Classification Tree Processing

Figure 4:
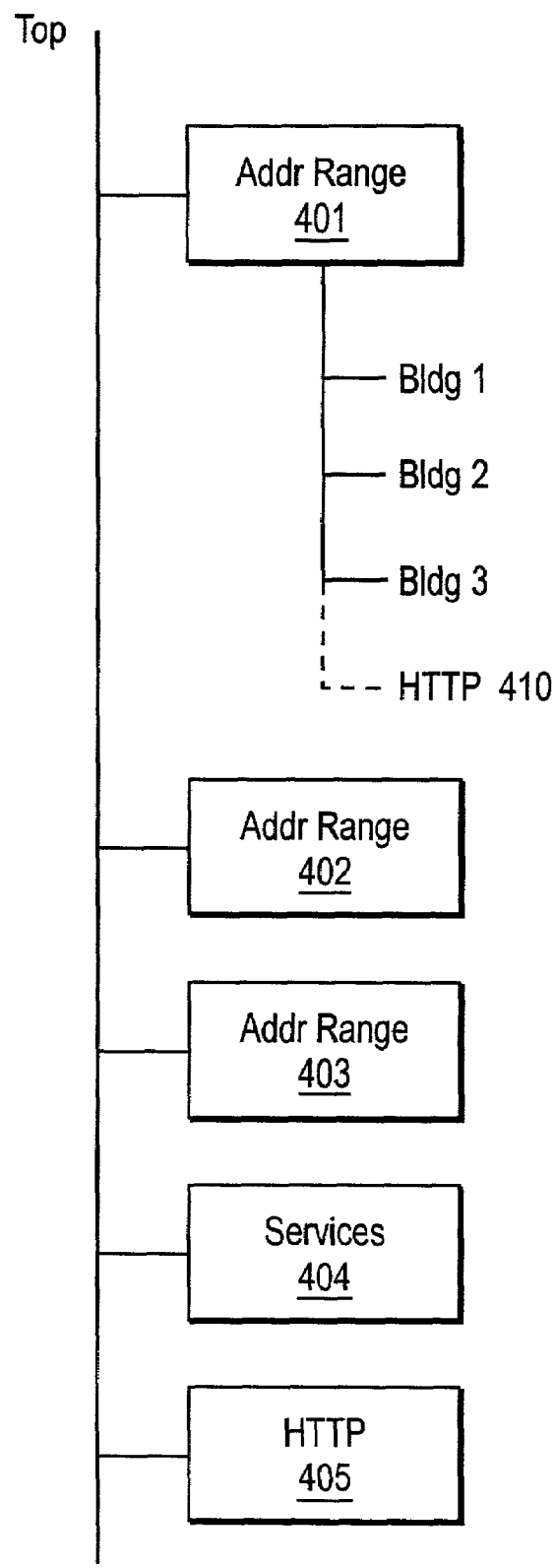
FIG. 4 illustrates a representative class tree.

FIG. 4 depicts a representative allocation of bandwidth made by a hypothetical network manager as an example. In FIG. 4, the network manager has decided to divide the network resources first by allocating bandwidth between address ranges 401–403, a service type 404 and World Wide Web server traffic class (HTTP) type. Each of address ranges 401–403 may represent a subnet. FIG. 4 shows the resulting classification tree, in which address range bandwidth resources 401–403 and service bandwidth resources 404 and HTTP type bandwidth resources each have their own nodes representing a specific traffic class for that classification type. Each traffic class may have a policy attribute or other user programming information associated with it. Next, the network manager has chosen to divide the bandwidth resources of address range 401 among buildings 1–3 and the HTTP bandwidth resources among a number of addresses. Each of these nodes may have separate user programming information associated with them.

In the case of the tree given in FIG. 4, no reordering of the classification tree is needed since the address range classification types that can be used to match to a class of incoming traffic and the address range classification types are not mixed types. They are a "pure" address range that can be cached. However, if a HTTP classification type 410 is added, then address range 401 has mixed classification types and cannot be cached by itself. In such a case, reordering would place address range 401 on the tree with non-mixed cacheable classification types ahead of address range 401.

In one embodiment, the classification tree is ordered so that the pure classification types appear in the classification tree before mixed classification types. For example, in one embodiment, address classification types are encountered first during classification tree processing, the pure service classification types occur second, the pure port classification types occur third, followed by the mixed classification types.

Although the present invention is described with reference to cache host addresses, the techniques described herein are applicable to other types of classification criteria, such as, for example, but not limited to, source or destination ports, protocol types, VLAN types, packet length, and/or routing information.

One embodiment of the classification tree processing described above is given in pseudo code form below.

```
1   tclass = top of classification tree.
2   inCache = FALSE
    while (TRUE) {
3       CACHE_PROC_PTR  cacheProc;
4       TCLASS_PTR      cacheEnd
5       if(!inCache && tclassIsCacheStart (tclass, &cacheProc, &cacheEnd)) {
6           int result = cacheProc(flowToMatch, &tclass, FIND);
            if (result == FOUND)
7               return tclass;
            if (result == NOTFOUND)
8               tclass = cacheEnd;
            else /* Don't know so walk tree */
9               inCache = TRUE;
            /* Otherwise, tclass is left at the start of the cache */
        }
        if (flowToMatch matches tclass) {
            if (inCache)   /* Update cache with flow info */
10              cacheProc(flowToMatch, tclass, FOUND);
            return tclass;
        }
11      tclass = tclass->next;
        if (inCache && tclass == cacheEnd) {
            /* Update cache with flow info */
12          cacheProc(flowToMatch, NULL, NOTFOUND);
13          inCache = FALSE;
        }
    }
```

The variable tclass indicates the location in the classification tree. The variable inCache indicates whether the cache should be used or not. In the case of "don't know", inCache would be FALSE and thus the classification tree would be walked. The variable cacheProc is a procedure pointer returned from tclassIsCacheStart. This procedure is called to get or set the cache entry information. The variable cacheEnd points to one passed the last class in a cache. C1 add, C2 add and C3 add indicate an entry has been added to either the C1, C2 or C3 caches respectively. The operation of the above pseudo code may be explained through the use of an example given below.

FIG. 5 illustrates a classification tree. Referring to FIG. 5, classes are represented using TC0 through TC7, where the DEFAULT class is a match-all class for flows/packets that do not match the more specific classes. Note that classification trees may include more or less classes than are shown in FIG. 5. FIG. 5 also shows three caches, C1 through C3, where classes TC-1 and TC-2 are C1 cacheables, classes TC-4 and TC-5 are C2 cacheables, and TC-6 is C3 cacheable. Note also that the start and end of caches and that flow, F1, is classified as TC-6.

FIGS. 6 and 7 illustrate two cases of how information about a flow, F1, is added to the caches (in case 1 shown in FIG. 6) and later used for a faster lookup (in cases 2 shown in FIG. 7). Referring to FIG. 6, in case 1, the network device performs a number of passes through the "while loop" to search the classes to match the class type of the first packet of flow1 (F1) with classes in the classification tree. In case 1, F1 does not match any of the C1 or C2 cacheables. Therefore, a F1 entry is added to C1 and C2 with a NOTFOUND status set in the third and sixth passes through the while loop, respectively. This is done so that C1 and C2 can be quickly identified in case 2 (FIG. 7) as areas to skip in the tree. In case 1, the notation for adding a NOTFOUND entry to a cache is "F1,12NF" where F1 is the flow number, 12 is the pseudo-code line number in the pseudo-code given below, and NF indicates it was not found in the cache.

The cache and tree walking continue in case 1 until F1 matches TC-6. Thus, the class of F1 is found and F1 is added to C3 as a FOUND entry. To elaborate, in case 1, it is the first time through the tree so the tree has to be walked until a match is found. All that is known before getting to the TC-6 is that it is not in cache C1 and C2.

Referring to FIG. 7, during case 2, a second packet of F1 is classified. In the second and third passes of the while loop, because a NOTFOUND entry was added to each of the caches, the determination that this second packet is not in the C1 and C2 caches occurs much earlier (after three passes through the while loop versus six passes through the while loop). Therefore, the determination that the second packet is found in cache C3 is able to occur more quickly.

In one embodiment, each class in the classification tree has a timestamp associated with it. In other words, when a hash table is used, a timestamp is included that indicates the last time each hash was saved. This allows an individual to modify portions of the classification table and the entire process of applying the hash function to all the classes in a cacheable portion of the tree does not have to be performed again. However, because it is possible that the classification tree can change, even if a hash is found with a pointer to a class, the time stamp must still be valid for the results of the classification to indicate that a class in the classification tree matching that of the incoming flow was found. A time stamp is considered valid if it is more recent than the last time the tree was modified.

Figure 8:
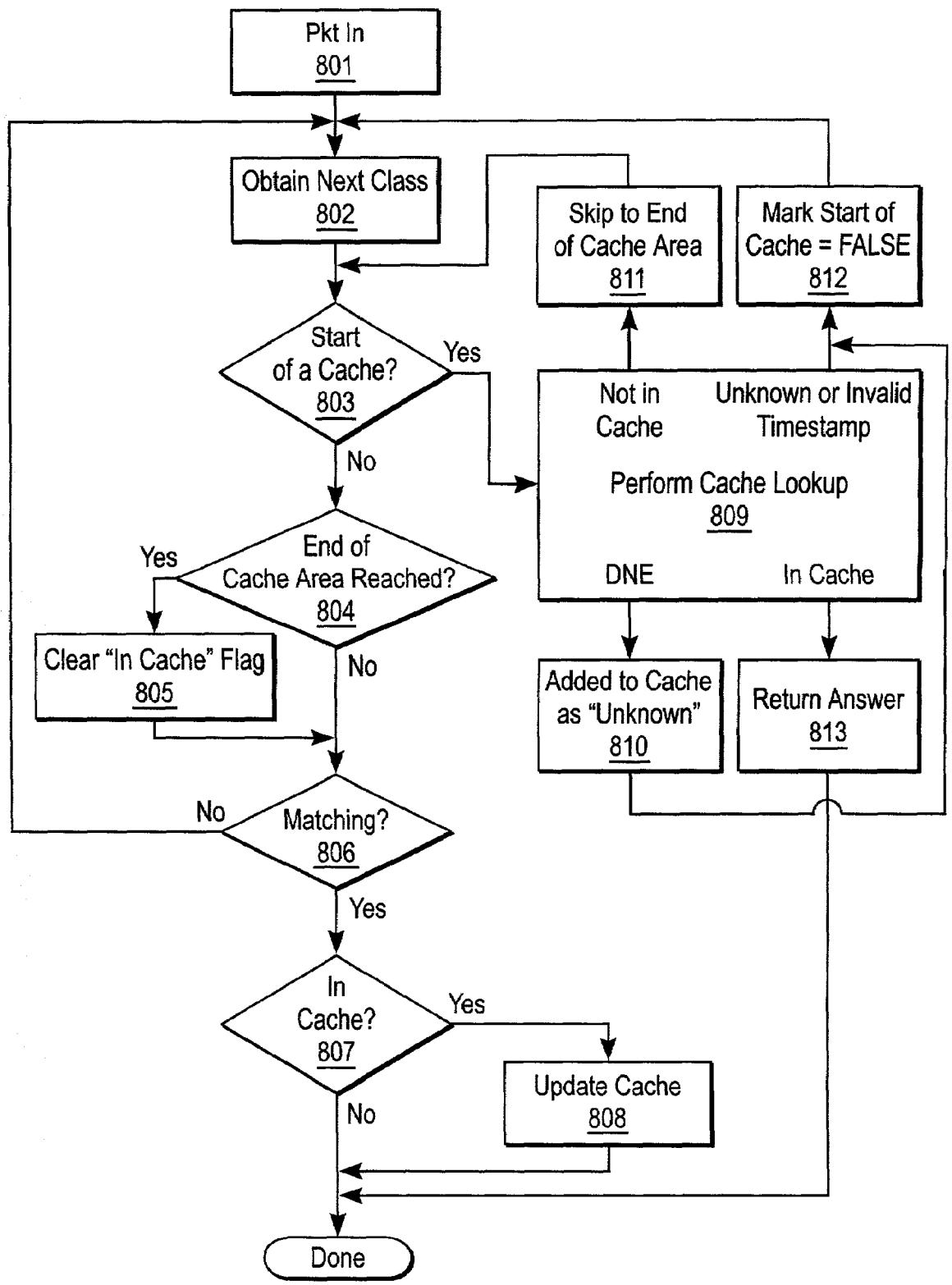
FIG. 8 is a flow diagram of one embodiment of a classification process performed by a network device.

FIG. 8 is a flow diagram of one embodiment of a process performed by a classification engine in a network device as part of the classification process. Referring to FIG. 8, initially, a packet is received (processing block 801), and the classification engine obtains the next class (processing block 802). The classification engine then tests whether it is a start of a cache (processing block 803). If it is not, processing logic transitions to processing block 804, where the classification engine tests whether it is the end of the caching area. If it is the end of the caching area, the classification engine clears the "in cache" flag (processing block 805) and transitions to processing block 806. If it is not the end of the cache area, the processing logic transitions directly to processing block 806.

If the classification engine determines it is the start of a cache in processing block 803, processing logic transitions to processing block 809 where the classification engine performs the cache look-up. If the results of the cache look-up is a determination that the class state is unknown, then processing transitions to processing block 810 where processing logic adds to the cache by marking the entry as "unknown" and transitions to processing block 812. If the result of the cache look-up is that the classification determines that the class is in the cache, then processing logic transitions to processing block 813 where the results of the cache look-up are returned and the classification lookup is done. If the result of the cache look-up is a determination that the class is not in the cache, processing logic transitions to processing block 811 where processing logic skips to the end of the cache and transitions to processing block 803. If the results of the cache look-up are that it is unknown whether the class is in the cache or the entry in the cache that matches the class has an invalid timestamp, processing logic transitions to processing block 812 where processing logic marks the "start of cache" as FALSE (in the pseudo algorithm this parameter is referred to as in Cache) and thereafter transitions to processing block 802.

At processing block 806, processing logic tests whether the class matches. If the class does not match, processing logic transitions to processing block 802. If the class does match, processing logic transitions to processing block 807, where processing logic tests whether a class is in the cache. If the class is not in the cache, then processing logic is done. However, if the process in the cache, the cache is updated (processing block 808) and then the processing logic is done. As part of the cache updating process, the timestamp is updated as well.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. In a hierarchical classification system including a classification tree comprising a plurality of traffic classes, wherein at least one traffic class of the plurality of traffic classes corresponds to a first classification type and at least one other traffic class in the plurality of traffic classes corresponds to a second classification type, wherein the classification tree further comprises a cache storing a data structure representing a cacheable portion of the classification tree, wherein the data structure corresponds to the at least one traffic class of the first classification type, a method comprising:

walking the classification tree to determine whether an incoming flow matches a traffic class in the classification tree; and upon encountering the cacheable portion of the classification tree, performing a lookup on the cache to compare the incoming flow with of the at least one traffic class of the first classification type to determine whether the incoming flow matches one of the at least one traffic class.

2. The method defined in claim 1 wherein the data structure comprises a hash table.

3. The method defined in claim 1 further comprising returning a class pointer indicative of user programming information that has been assigned to a traffic class if the incoming flow matches the traffic class.

4. The method defined in claim 1 further characterized by performing a walk through the plurality of traffic classes in the classification tree if a determination that the traffic class in the at least one traffic class is not known as a result of performing the cache lookup.

5. The method defined in claim 4 wherein if the incoming flow hits the cache, then further comprising:

returning a result indicating the incoming flow was in the cache.

6. The method defined in claim 4 wherein if the incoming flow hits the cache and no traffic class is identified, further comprising:

continuing to walk the classification tree from a location in the classification tree immediately after the end of the cacheable portion of the classification tree represented in the cache.

7. The method of claim 1 further comprising conditionally walking, if no entry is found in the data structure, the cacheable portion of the classification tree to match the incoming flow to the at least one traffic class, and then:

creating, if the incoming flow does not match one of the at least one traffic class in the cacheable portion of the classification tree, an entry in the data structure indicating that the incoming flow, relative to the first classification type, does not match a traffic class in the cacheable portion; or creating, if the incoming flow matches one of the at least one traffic class in the cacheable portion of the classification tree, an entry in the data structure, based on the first classification type, corresponding to the incoming flow and the matching traffic class.

8. An apparatus for use in a hierarchical classification system performing caching, the apparatus comprising:

a memory storing a classification tree comprising a plurality of traffic classes, wherein at lease one traffic class in the plurality of traffic classes corresponds to a first classification type and at least one other traffic class in the plurality of traffic classes corresponds to a second classification type;

a cache operative to store a cacheable portion of the classification tree, wherein the cacheable portion of the classification tree corresponds to at least one traffic class in the plurality of traffic classes of the first classification type; and a classification engine coupled to the memory to walk the classification tree as to determine whether an incoming flow matches a traffic class in the classification tree, and, when the cacheable portion of the classification tree is encountered, to perform a lookup on the cache to determine whether the incoming flow matches one of the at least one traffic classes of the first classification type.

9. The apparatus defined in claim 8 wherein the data structure comprises a hash table.

10. The apparatus defined in claim 8 wherein the classification engine returns a class pointer indicative of user programming information that has been assigned to a traffic class if the incoming flow matches the traffic class.

11. The apparatus defined in claim 8 wherein the classification engine performs a walk through the cacheable portion of the classification tree if a determination that the traffic class corresponding to the incoming flow is not known as a result of performing the cache lookup.

12. The apparatus defined in claim 11 wherein if the incoming flow matches a traffic class corresponding to a cacheable portion of the classification tree, then the classification engine:

creates an entry in the data structure including an attribute of the incoming flow defined by the first classification type and the matching traffic class; and returns a result indicating the matching traffic class.

13. The apparatus defined in claim 11 wherein if the incoming flow does not match a traffic class in the cacheable portion of the classification tree, then the classification engine:

creates an entry in the data structure including an attribute of the incoming flow defined by the first classification type and an indication that the class is not in the cache; and continues to walk the classification tree from a location in the tree immediately after the end of the cacheable portion of the classification tree represented in the cache.

14. An apparatus for use in a hierarchical classification system performing caching, the apparatus comprising:

a memory storing a classification tree comprising a plurality of traffic classes, wherein at lease one traffic class in the plurality of traffic classes corresponds to a first classification type and at least one other traffic class in the plurality of traffic classes corresponds to a second classification type;

a cache operative to store a cacheable portion of the classification tree, wherein the cacheable portion of the classification tree corresponds to at least one traffic class in the plurality of traffic classes of the first classification type; and a classification engine operative to:

determine, relative to the first classification type, whether the cache contains an entry matching an incoming flow;

conditionally walk, if no entry is found in the cache, the cacheable portion of the classification tree to match the incoming flow to the at least one traffic class, and then:

create, if the incoming flow does not match one of the at least one traffic class in the cacheable portion of the classification tree, an entry in the cache indicating that the incoming flow, relative to the first classification type, does not match a traffic class in the cacheable portion; or create, if the incoming flow hits one of the at least one traffic class in the cacheable portion of the classification tree, an entry in the cache, based on the first classification type, corresponding to the incoming flow and the matching traffic class.

15. The apparatus of claim 14 wherein the cache comprises a hash table.

16. In a hierarchical classification system performing caching, a method for classifying a flow comprising:

ordering a classification tree including a plurality traffic classes, wherein at least one traffic class corresponds to a first classification type, and wherein at least another traffic class corresponds to a second classification types by grouping at least a portion of the traffic classes of each type together in the classification tree;

creating a it data structure, representing a first cacheable portion of the classification tree, of a plurality of traffic classes of the first classification type to facilitate determination of whether the flow matches any traffic classes in the first data structure;

creating a second data structure, representing a second cacheable portion of the classification tree, of a plurality of traffic classes of the second classification type to facilitate determination of whether the flow matches any traffic classes in the second data structure.

17. The method defined in claim 16 wherein the first data structure comprises a hash table.

18. The method defined in claim 16 wherein the first classification type in the classification tree includes network addresses.

19. The method defined in claim 18 wherein the second classification type in the classification tree includes one or more network services.

20. The method defined in claim 19 wherein the second classification type in the classification tree further include on or more ports.

21. The method defined in claim 18 wherein the network addresses comprise Internet Protocol (IP) addresses.

* * * * *